United States Patent [19]

Kardach et al.

[11] Patent Number: 5,535,420
[45] Date of Patent: Jul. 9, 1996

[54] METHOD AND APPARATUS FOR INTERRUPT SIGNALING IN A COMPUTER SYSTEM

[75] Inventors: James Kardach, San Jose; Sung S. Cho, Sunnyvale; Nicholas B. Peterson; Thomas R. Lane, both of San Jose, all of Calif.

[73] Assignee: Intel Corporation, Santa Clara, Calif.

[21] Appl. No.: 356,131

[22] Filed: Dec. 14, 1994

[51] Int. Cl.$^6$ ..................................................... G06F 13/24
[52] U.S. Cl. ..................... 395/868; 364/941; 364/DIG. 2
[58] Field of Search ..................................... 395/736, 739, 395/733, 868, 867

[56] References Cited

U.S. PATENT DOCUMENTS

| | | | |
|---|---|---|---|
| 4,326,249 | 4/1982 | Godsey | 395/868 |
| 4,847,752 | 7/1989 | Akashi | 395/868 |
| 5,083,261 | 1/1992 | Wilkie | 395/738 |
| 5,193,195 | 3/1993 | Miyazaki | 395/735 |
| 5,218,703 | 6/1993 | Fleck et al. | 395/737 |
| 5,261,107 | 11/1993 | Klim et al. | 395/739 |
| 5,265,255 | 11/1993 | Bonevento et al. | 395/733 |
| 5,317,747 | 5/1994 | Mochida et al. | 395/733 |
| 5,325,536 | 6/1994 | Chang et al. | 395/736 |
| 5,404,457 | 4/1995 | Gephardt et al. | 395/733 |
| 5,432,943 | 7/1995 | Mitsuishi | 395/725 |

*Primary Examiner*—Gopal C. Ray
*Attorney, Agent, or Firm*—Blakely, Sokoloff, Taylor & Zafman

[57] ABSTRACT

A computer architecture which provides for the dynamic configuration of peripheral interrupts. A global router is implemented for mapping interrupts received over a multiple-line shared interrupt bus to correspond to system standard IRQ interrupt signals for a programable interrupt controller (PIC). The global router may configure interrupts to be both level sensitive and edge-triggered interrupts as well as being sharable among multiple devices. The global router further provides its interrupts to a shared interrupt bus which may receive other system interrupts for propagation to the computer system's PIC. The global router provides a centrally located motherboard resource that provides a totally flexible interrupt configuration scheme.

11 Claims, 2 Drawing Sheets

METHOD AND APPARATUS FOR INTERRUPT SIGNALING IN A COMPUTER SYSTEM

BACKGROUND OF THE INVENTION

1. Field of the Invention

The present invention relates to computer system architectures. More particularly, the present invention relates to interrupt signaling by components within a computer system.

2. Art Background

In the computer industry, one widely accepted system architecture for personal computers has been the AT system design. Prior systems incorporating this architecture included system buses implementing the ISA, and then later, the EISA bus protocols. This protocol defines fifteen distinct system interrupts for use by various components within the system. These interrupts, by convention, are denoted IRQ0 through IRQ15 with one of the IRQ signals, such as IRQ2 being dedicated for internal use by the system's programmable interrupt controller. In a conventional implementation, these are edge-triggered interrupt signals provided by a system component or peripheral to the computer system's interrupt controller.

The above described computer systems that implement the ISA or EISA bus protocol interrupt mechanisms generally incorporate an interrupt controller that receives the various IRQ signals and, in response thereto, provides a signal to the system's central processing unit (CPU) indicating the existence of a pending interrupt. The CPU, in response to an active interrupt signal, acknowledges the interrupt signal to the interrupt controller whereupon the interrupt controller provides a code vector to the CPU for executing the appropriate interrupt service routine (ISR). One well known programmable interrupt controller mechanism is one which implements two Intel 8259 peripheral interrupt controllers.

In the one embodiment, each of the two 8259 peripheral interrupt controllers is capable of receiving eight distinct IRQ signals. To support the full range of IRQ signals [0:15], the first 8259 controller is configured to receive IRQs 8–15 and generate an interrupt signal output as response thereto. The output of the first 8259 controller is then provided as one of the IRQ inputs such as IRQ0 to a second 8259 controller with the other seven inputs coming from other system components. The second 8259 controller in the programmable interrupt controller mechanism (PIC) supplies its output to the CPU. In this manner, two 8 IRQ input peripheral interrupt controllers are chained together to provide for 15 possible IRQ signals within the system.

The above interrupt signaling protocol suffers some unfortunate disadvantages. Particularly, it anticipates a rigid assignment of IRQ signals that are also of a predetermined type (i.e., edge-triggered interrupts). In addition, it is not conducive to the sharing of interrupts and thus limits the total number of peripherals that might indicate a pending interrupt request to a system's CPU. These concerns are magnified in developing systems where portability and low pin count constraints are considerations that are paramount. It would be desirable, and is therefore an object of the present invention, to provide flexibility in interrupt signaling which reduces peripheral pin count necessities as well as provides for the sharing of system interrupts and configurability without increasing the complexity of a peripheral's interconnections to the interrupt mechanism of a computer system.

SUMMARY OF THE INVENTION

From the foregoing, it can be appreciated that a computer system's architecture may be enhanced in a manner that provides flexibility and reduces the cost of implementing peripherals, as well as reducing peripheral pin requirements while still complying with a multiple-pin interrupt protocol. Accordingly, it is an object of the present invention to provide a method and apparatus for flexibly configuring computer system interrupts generated by peripherals within a computer system. Particularly, it is an object of the present invention to implement an interrupt mapping mechanism for globally configuring system interrupts having varying characteristics and a mapping capability for enhanced computer system flexibility. It is further an object of the present invention to provide a sharable interrupt bus which receives both the remapped interrupts from the global routing mechanism as well as interrupts from another interrupt generating source.

These and other objects of the present invention are provided through the introduction of a global router or global remapping logic implemented to translate interrupts received over a multi-line interrupt bus. The global router defines registers in an address space which may be set to map any of the received interrupts to a particular system IRQ interrupt input to the computer system's programmable interrupt controller (PIC) mechanism. The PIC in turn generates the interrupt signal to the computer system's CPU so that the CPU may accordingly execute an appropriate interrupt service routine (ISR).

The global router implemented in one embodiment of the present invention is compliant with industry standard PIC protocols and allows the IRQ inputs to the PIC to be programmed to be both level sensitive or edge triggered. Further, the peripheral interrupts may be configured to be sharable for interrupts which are defined as level-sensitive. When a PIC interrupt request signal is programmed as edge triggered, then a signal on the interrupt bus will generate a rising edge signal to create an interrupt. When a PIC interrupt request signal is programmed as level sensitive, then any signal on the sharable interrupt bus line, in one embodiment, should generate a low signal to create an interrupt.

Registers in a dedicated memory space are provided for programming the various attributes of the PIC's interrupt request signals while additional registers in the memory space within the global router are designated for configuring the interrupts that are subject to the global routing. The global router takes interrupt requests from the shared motherboard interrupt request lines and routes them to a configured interrupt request signal on a sharable interrupt bus. This provides a centrally located motherboard resource that provides a totally flexible interrupt configuration scheme.

BRIEF DESCRIPTION OF THE DRAWINGS

The objects, features and advantages of the present invention will be made apparent from the following detailed description in which.

DETAILED DESCRIPTION OF THE INVENTION

A method and apparatus are provided for an interrupt signaling mechanism in a computer system that implements a programable interrupt controller. In this detailed description, one embodiment of the computer system is described which is suitable for implementing a global interrupt remapping mechanism. It should be understood that the particular computer architecture described is for the purpose of illustration and is not provided as a limitation, in that the present invention may be practiced with other computer systems where it is desired to flexibly configure the interrupt signal handling to achieve the advantages of the present invention.

Throughout this detailed description, numerous specific details are set forth such as memory address space designations and bit designations within various registers, in order to provide a thorough understanding of the present invention. It will be appreciated by one having ordinary skill in the art that the present invention may be practiced without such specific details. In other instances, well known components, structures and techniques have not been described in detail in order to avoid obscuring the subject matter of the present invention. Particularly, much of the functionality of the present invention is going to be described in terms of logic circuitry for decoding register-based interrupt configuration. It will be understood by those having ordinary skill in the art that the functionality of the present invention may be implemented by various techniques including, but not limited to the use of application specific integrated circuits (ASIC), programmable logic devices, or dedicated logic circuitry. In addition, signal names identified in this detailed description are in some cases described to be active in one state and inactive in another state. The teachings of the present invention are, of course, applicable to the inverted case as well.

Figure 1:
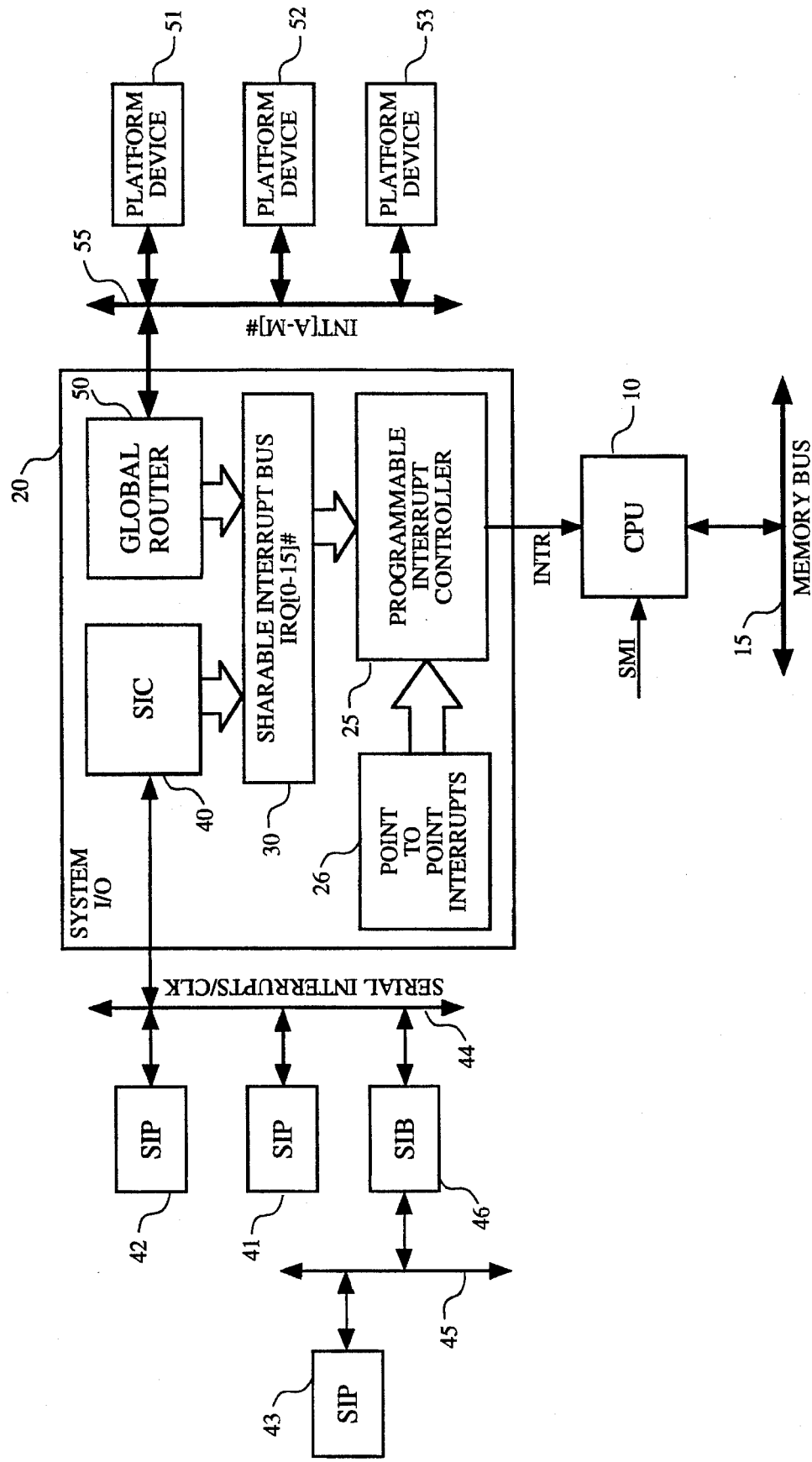
FIG. 1 illustrates a block diagram of a computer system architecture implementing the global router interrupt handling mechanism in accordance with one embodiment of the present invention.

Referring now to FIG. 1, a computer system architecture which may incorporate the present invention is illustrated. The computer system architecture of FIG. 1 is illustrated so as to highlight the hierarchical interrupt organization of the architecture. Numerous components of the computer system not involved within the scope of the present invention are not shown. It can be seen that the computer system includes a central processing unit (CPU) 10 that is coupled to a memory bus 15 for communication with the computer system's memory system (not shown). The illustrated CPU 10 is also shown receiving two control signals. One is the INTR interrupt signal from the system I/O controller 20. The other is a system management interrupt (SMI) which may be received whenever any peripheral requires a system management interrupt. As will be described more fully below, the INTR signal to the CPU is the conventional interrupt signal from the system is programmable interrupt controller mechanism (PIC) 25 which informs the CPU 10 when a system component requires the CPU 10 to execute an interrupt service routine (ISR).

In one embodiment of the present invention, the CPU 10 is a microprocessor designed in accordance with the Intel microprocessor architecture. This architecture supports a mode of operation referred to as system management mode (SMM). For the support of system management mode, the CPU in certain circumstances must receive a special interrupt from the various peripherals of the system referred to as the system management interrupt (SMI). Accordingly, the CPU 10 of the illustrated computer architecture is shown receiving the SMI interrupt for system management interrupt processing as well as the conventional INTR interrupt signal.

The system I/O controller 20 includes the programmable interrupt controller mechanism 25 for the computer system. As described above, this may be two Intel 8259 PICs configured in such a manner as to receive the fifteen possible IRQ signals from the varying system components and in response thereto, provide the INTR signal to the CPU 10. In alternative embodiments, other PIC mechanisms may be implemented which perform the same functionality. There is also shown in FIG. 1 that point-to-point interrupts 26 may be independent of the other interrupts to be described herein below. Such point-to-point interrupts may include floating point errors and timer output signals. They connect to the system PIC in a manner conventionally known in the art.

The remaining interrupts of interest with respect to the present invention are all provided to the system PIC through a sharable interrupt bus 30. The sharable interrupt bus 30 allows multiplexing of interrupt requests received over both the serial interrupt controller (SIC) 40 and through the global router 50. It should be noted that an interrupt line is only sharable if all the interrupts on the line are level-sensitive interrupts.

Interrupts processed through SIC 40 are the subject of co-pending U.S. patent application "Serial Interrupt Bus Protocol", Ser. No. 08/351,637, filed Dec. 7, 1994. That application describes in detail how serial interrupt peripherals 41, 42 and 43 are capable of implementing a serial interrupt protocol for signaling interrupts through the serial interrupt controller 40 through integration of a primary serial interrupt bus 44 and a secondary serial interrupt bus 45. Further described therein is the use of serial interrupt bridge 46 for coupling the primary and secondary buses 44 and 45, respectively.

The focus of the present invention is on the implementation of the global router 50 which allows for platform peripherals 51, 52 and 53 to be flexibly configured with respect to their interrupt signaling over shared interrupt bus 55. The shared interrupt bus 55, in accordance with one embodiment of the present invention, defines thirteen sharable interrupts INT-A to INT-M which the peripherals associated therewith may be configured to utilize. The global router provides for a register-based programming scheme which defines how interrupt signals over the shared interrupt bus 55 will be passed to the programmable interrupt controller 25.

Figure 2:
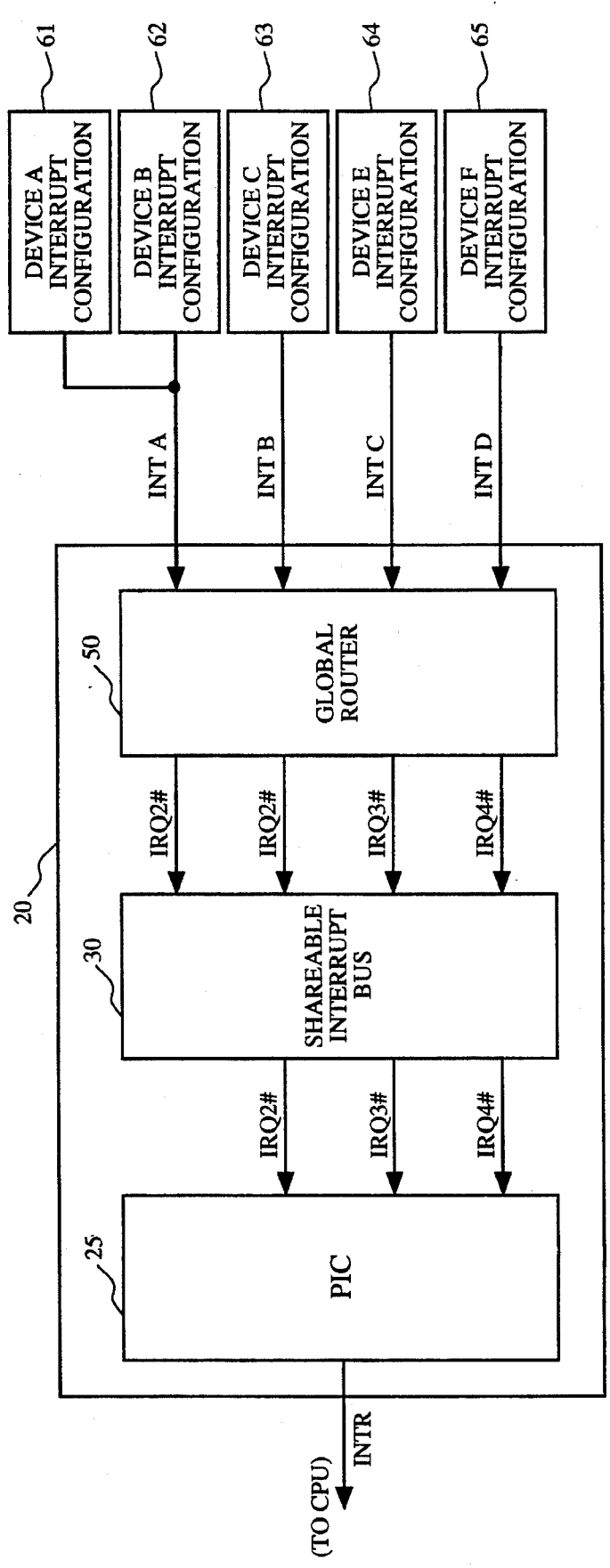
FIG. 2 illustrates one configuration for utilizing the global router of the present invention.

FIG. 2 represents how the interrupt signaling configuration is off-loaded from peripheral devices onto the system motherboard in accordance with the present invention. Two concepts are highlighted by this figure. The first is that the INT signals are sharable. Note that both Device A 61 and Device B 62 are configured for driving the INT-A signal. The second concept highlighted is the fact that interrupt requests are also sharable. Note that INT-A and INT-B both point to IRQ2 on the sharable interrupt bus 30. Hence, in the illustrated configuration of FIG. 2, Devices A, B and C are configured such that they all request the IRQ2 interrupt vector.

The global interrupt router 50 also provides the ability to make the INT signals active high or active low (when pointing to an IRQ signal programmed to be level), or rising edge or falling edge-triggered (when pointing to an IRQ signal programmed to be edge). This allows devices to generate interrupts to be seamlessly connected to the motherboard without any glue logic (for example, an inverter for an opposite polarity interrupt).

In accordance with the present invention, the global router 50 implemented in the system I/O controller 20 incorporates a number of registers or other memory elements in a defined I/O space for configuring the interpretation of INT signals received over the shared interrupt bus 55. The following tables illustrate the register configuration for the global router 50 in accordance with one embodiment of the present invention:

TABLE I

IRQ0-15 LVLEDG SEL
16 Bits Read/Write Register
Address: 0000 04D0-D1h

| Bits | | Description | |
|---|---|---|---|
| 0 | | Reserved | |
| 1 | IRQ1 LVL/EDG# | 0:Edge | 1:Level |
| 2 | IRQ2 LVL/EDG# | 0:Edge | 1:Level |
| 3 | IRQ3 LVL/EDG# | 0:Edge | 1:Level |
| 4 | IRQ4 LVL/EDG# | 0:Edge | 1:Level |
| 5 | IRQ5 LVL/EDG# | 0:Edge | 1:Level |
| 6 | | Reserved | |
| 7 | RQ7 LVL/EDG# | 0:Edge | 1:Level |
| 8 | | Reserved | |
| 9 | IRQ9 LVL/EDG# | 0:Edge | 1:Level |
| 10 | IRQ10 LVL/EDG# | 0:Edge | 1:Level |
| 11 | IRQ11 LVL/EDG# | 0:Edge | 1:Level |
| 12 | IRQ12 LVL/EDG# | 0:Edge | 1:Level |
| 13 | | Reserved | |
| 14 | IRQ14 LVL/EDG# | 0:Edge | 1:Level |
| 15 | IRQ15 LVL/EDG# | 0:Edge | 1:Level |

The data illustrated in Table I defines register configurations for programming whether IRQs to be provided to the system PIC are level sensitive or edge triggered. In accordance with the illustrated embodiment, if an interrupt is programmed to be edge triggered, a rising edge is assumed for reception on the sharable interrupt bus 30. If an interrupt is programmed to be level sensitive, then an active low signal is assumed on the sharable interrupt bus 30. These, of course, may be inverted for alternative embodiments of the present invention. The data in Table I defines the bit settings for registers found in the standard I/O space at address 0000 04D0-D1h.

The remaining registers to be described will each appear in the standard I/O space. The memory used is written to, in one embodiment, by using the well-known AT/EISA bus protocol. The address given for each register is given as an offset from an I/O base address to be defined in an extended interrupt base I/O register (EXTINT_BASE). That 32 bit register defines the base I/O address and should be programmed to correspond to a 32-byte boundary.

Table II below illustrates the settings for the INTAD_ROUT routing register:

TABLE II

INTAD_ROUT - Interrupt A-D Routing Register
16 Bits Read/Write
Address Offset: 2,3h [from EXTINT_BASE]

| Bits | | Description |
|---|---|---|
| 3:0 | INTA_Rout | These four bits control interrupt routing for INT-A. |
| | Bits 3,2,1,0 | IRQ Level |
| | 0,0,0,0 | Unused |
| | 0,0,0,1 | IRQ1 |
| | 0,0,1,0 | IRQ2 |
| | 0,0,1,1 | IRQ3 |
| | 0,1,0,0 | IRQ4 |
| | 0,1,0,1 | IRQ5 |
| | 0,1,1,0 | Reserved |
| | 0,1,1,1 | IRQ7 |
| | 1,0,010 | Reserved |
| | 1,0,0,1 | IRQ9 |
| | 1,0,1,0 | IRQ10 |
| | 1,0,1,1 | IRQ11 |
| | 1,1,0,0 | IRQ12 |
| | 1,1,0,1 | Reserved |
| | 1,1,1,0 | IRQ14 |
| | 1,1,1,1 | IRQ15 |
| 7:4 | INTB_ROUT | These four bits control routing for INT-B. |
| 11:8 | INTC_ROUT | These four bits control routing for INT-C. |
| 15:12 | INTD_ROUT | These four bits control routing for INT-D. |

Table II illustrates that 16-bit registers at address 2,3 h offset from the base address found in the EXTINT_BASE register control the routing of four of the shared interrupts: INT-A to INT-D. Bits 0–3 are used for controlling the interrupt routing for INT-A with the bit designations specified thereunder. Similarly, bits 4–7 are used for the INT-B routing with the same bit designations for each possible IRQ. The same is true for INT-C and INT-D at bits 11-8 and 15-12, respectively.

Another register, INTEH_ROUT is also defined at an offset from the EXTINT_BASE address for defining the IRQ routing for the INT-E to INT-H shared interrupts. In a similar manner, a register INTIL_ROUT is defined for interrupts INT-I to INT-L. The final register is defined at an offset from the EXTINT_BASE address for bit definitions for routing INT-M.

In accordance with one embodiment of the present invention, a number of default routings may be defined. For example, INT-F may, by default, be used for a PS2 mouse and point to IRQ12 with bit settings (1,1,0,0). INT-G may, by default, point to IRQ4 for use as a COM1 interrupt and INT-H may be set to point to IRQ3, the conventional COM2 interrupt. Other default values include INT-J pointing to IRQ7 for signaling an LPT1 interrupt; INT-K pointing to IRQ5 for signaling an LPT2 interrupt and INT-L pointing to IRQ11 for signaling an audio interrupt. Finally, INT-M, by default, may point to IRQ14 for signaling an IDE hard disk drive interrupt. These, of course, may be altered in accordance with various embodiments of the present invention.

Table III below illustrates a table for defining the polarity values of the INT-A to INT-M shared interrupt signals. Table IV below illustrates a table for defining whether each interrupt is level-sensitive or edge-triggered.

TABLE III

INT A-M PLRTY_SEL - Interrupt Request
A-M Polarity Select
16 Bit Read/Write Register
Address Offset: C-Dh [from EXTINT_BASE]

| Bits | Description | | |
|---|---|---|---|
| 0 | INT A Polarity | 0:Active | 1:Active Low |
| 1 | INT B Polarity | 0:Active | 1:Active Low |
| 2 | INT C Polarity | 0:Active | 1:Active Low |
| 3 | INT D Polarity | 0:Active | 1:Active Low |
| 4 | INT E Polarity | 0:Active | 1:Active Low |
| 5 | INT F Polarity | 0:Active | 1:Active Low |
| 6 | INT G Polarity | 0:Active | 1:ACtive Low |
| 7 | INT H Polarity | 0:Active | 1:Active Low |

TABLE III-continued

INT A-M PLRTY_SEL - Interrupt Request
A-M Polarity Select
16 Bit Read/Write Register
Address Offset: C-Dh [from EXTINT_BASE]

| Bits | Description | | |
|---|---|---|---|
| 8 | INT I Poiaritv | 0:Active | 1:Active Low |
| 9 | INT J Polarity | 0:Active | 1:Active Low |
| 10 | INT K Polaritv | 0:Active | 1:Active Low |
| 11 | INT L Polarity | 0:Active | 1:Active Low |
| 12 | INT M Polarity | 0:Active | 1:Active Low |
| 15:13 | Reserved | | |

TABLE IV

INT A-M SENSE_SEL - Interrupt Request A-M Sensitivity Select
16 Bit Read/Write Register
Address Offset: E-Fh

| Bits | Description | | |
|---|---|---|---|
| 0 | INT A | 0:Edge | 1:Level |
| 1 | INT B | 0:Edge | 1:Level |
| 2 | INT C | 0:Edge | 1:Level |
| 3 | INT D | 0:Edge | 1:Level |
| 4 | INT E | 0:Edge | 1:Level |
| 5 | INT F | 0:Edge | 1:Level |
| 6 | INT G | 0:Edge | 1:Level |
| 7 | INT H | 0:Edge | 1:Level |
| 8 | INT I | 0:Edge | 1:Level |
| 9 | INT J | 0:Edge | 1:Level |
| 10 | INT K | 0:Edge | 1:Level |
| 11 | INT L | 0:Edge | 1:Level |
| 12 | INT M | 0:Edge | 1:Level |
| 15:13 | Reserved | | |

The polarity setting for each INT signal tells the global router how to be configured for receiving level-sensitive INT signals from the platform devices incorporated in the computer system. Similarly, the sensitivity select setting tells the global router whether a given INT signal is a level-sensitive or edge-triggered interrupt. This provides for flexibility for devices which drive the interrupt lines over interrupt bus 55.

There has thus been described a method and apparatus for flexibly configuring interrupts for use in a computer system implementing a shared interrupt bus. Although the present invention has been described with respect to illustrated and preferred embodiments, these are by way of illustration only. Those of ordinary skill in the art will recognize that the present invention may also be implemented with various modifications and refinements. Accordingly, the present invention should be judged in terms of the claims which follow.

What is claimed is:

1. A computer system comprising:
   a central processing unit (CPU) for executing an interrupt service routine in response to an interrupt pending signal;
   an interrupt controller coupled to provide said interrupt pending signal to said CPU in response to an interrupt request signal received over any one of a plurality of interrupt request signal lines;
   an interrupt bus having a plurality of interrupt signal lines for system components to signal interrupt signals over; and
   an interrupt mapping mechanism coupled to said interrupt bus to receive said interrupt signals and coupled to provide said interrupt request signal to said interrupt controller over one of said plurality of interrupt request signal lines responsive to said interrupt signals received over said interrupt bus, said interrupt mapping mechanism including a first set of programmable memory elements for corresponding each of said plurality of interrupt signal lines with a corresponding interrupt request signal line, said interrupt mapping mechanism allowing a plurality of interrupt signal lines to be mapped to a single interrupt request signal line to said interrupt controller.

2. The computer system of claim 1 wherein said interrupt controller includes a memory element for designating whether each interrupt request signal is a level-sensitive signal or an edge-triggered signal.

3. The computer system of claim 2 wherein said interrupt mapping mechanism further includes a second set of programmable memory elements for configuring said interrupt mapping mechanism with respect to the polarity of each of said plurality of interrupt signals. said polarity indicating whether said interrupt signal is active high or active low.

4. The computer system of claim 3 wherein said first and second sets of programmable memory elements comprise registers.

5. The computer system of claim 2 wherein said plurality of interrupt signal lines comprise interrupt signal lines which are each sharable by a plurality of system components.

6. The computer system of claim 1 further comprising a sharable interrupt bus coupled between said interrupt mapping mechanism and said interrupt controller, said sharable interrupt bus for coupling to receive interrupt request signals from another source of interrupt request signals, said sharable interrupt bus multiplexing said interrupt request signals from another source with said interrupt request signals from said interrupt mapping mechanism and providing said multiplexed interrupt request signals to said interrupt controller.

7. The computer system of claim 6 further comprising a serial interrupt controller coupled to provide interrupt request signals to said sharable interrupt bus corresponding to interrupt signals received over a serial interrupt bus.

8. A method of processing interrupts in a computer system comprising the steps of:
   signaling an interrupt signal on an interrupt bus;
   translating said interrupt signal with a programmable interrupt mapping mechanism into a corresponding interrupt request signal, said programmable interrupt mapping mechanism assigning a correspondence between signal lines of said interrupt bus and interrupt request signal lines providing interrupt request signals to an interrupt controller, said programmable interrupt mapping mechanism allowing a plurality of interrupt signal lines to be mapped to a single interrupt request signal line to said interrupt controller; and
   propagating said corresponding interrupt request signal to said interrupt controller over said corresponding interrupt request signal line.

9. The method of claim 8 further comprising the step of propagating said corresponding interrupt request signal through a sharable interrupt bus.

10. The method of claim 9 further comprising the step of configuring said programmable interrupt mapping mechanism with polarity information for each of said signal lines of said interrupt bus, said polarity information indicating whether said interrupt signals on each of said signal lines are active high or active low.

11. The method of claim 10 further comprising the step of configuring said interrupt controller to indicate sensitivity of each of said interrupt request signals, said sensitivity being either level sensitivity or edge-triggered sensitivity.

* * * * *

UNITED STATES PATENT AND TRADEMARK OFFICE
CERTIFICATE OF CORRECTION

PATENT NO. : 5,535,420
DATED : July 9, 1996
INVENTOR(S) : Kardach et al.

It is certified that error appears in the above-identified patent and that said Letters Patent is hereby corrected as shown below:

In the Abstract at [57] in line 5 delete "programable" and insert --programmable--

In column 3 at line 1 delete "programable" and insert --programmable--

In column 3 at line 48 delete "system is" and insert --system's--

In column 5 at line 62 delete "1,0,010" and insert --1,0,0,0--

In column 6 at line 65 delete "1:ACtive Low" and insert --1:Active Low--

In column 8 at line 18 delete "signals." and insert --signals,--

Signed and Sealed this

Fourth Day of February, 1997

*Attest:*

BRUCE LEHMAN

*Attesting Officer*      *Commissioner of Patents and Trademarks*